Aug. 19, 1941.    P. VAN WYK    2,252,909
GRADING MACHINE
Filed May 13, 1939
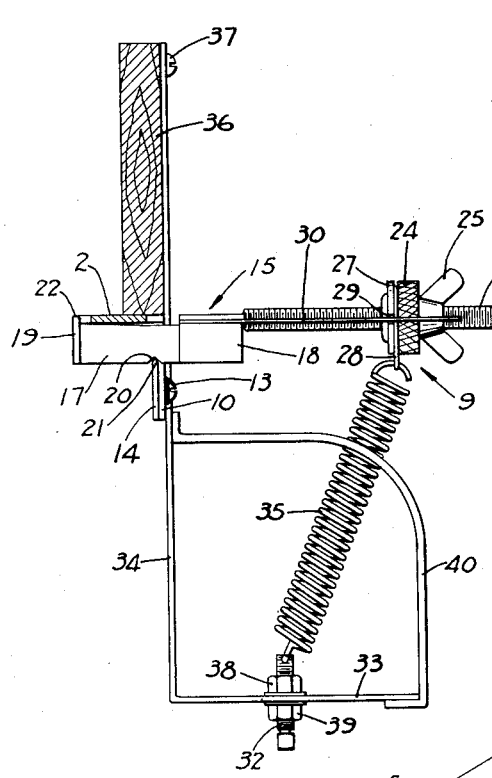
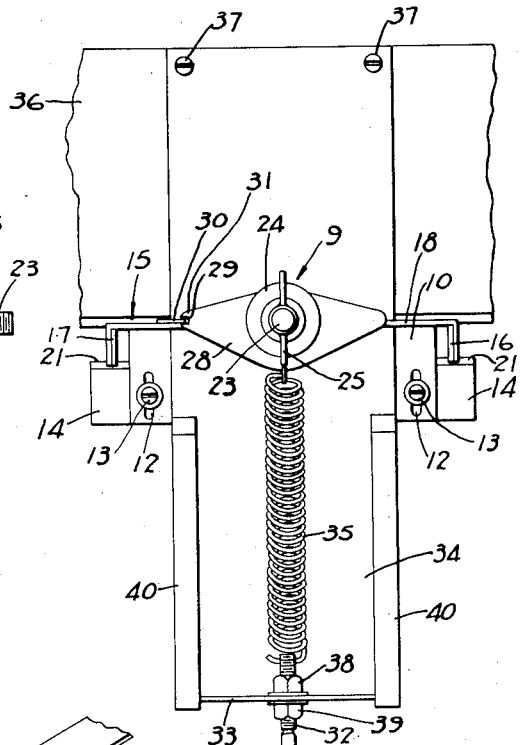
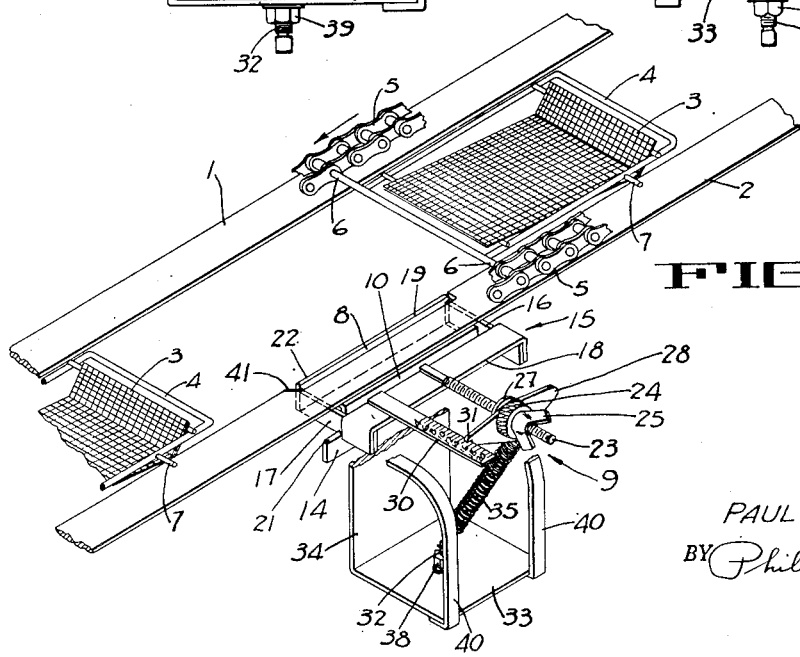
INVENTOR.
PAUL VAN WYK
BY Philip A. Minnis
ATTORNEY Patented Aug. 19, 1941

2,252,909

UNITED STATES PATENT OFFICE 2,252,909

GRADING MACHINE

Paul Van Wyk, Portland, Oreg., assignor to Food Machinery Corporation, San Jose, Calif., a corporation of Delaware Application May 13, 1939, Serial No. 273,465

3 Claims. (Cl. 209—121)

The present invention appertains to fruit grading machines of the type shown in United States Letters Patent to Frank W. Cutler No. 1,184,697, dated May 23, 1916, for grading fruit by weight, and is more particularly concerned with the provision of an improved weighing mechanism in such machines.

It has been found in practice that in weighing mechanisms for the type of fruit grading machines above referred to there is a certain lag in the operation of the scale beam due to the inertia and momentum of the scale weight. This causes chattering or vibrating of the scale beam subsequent to its actuation when the same returns to normal position, which frequently influences the next succeeding weighing operation so that improper grading results.

Due to the fact that the fruit carrying pockets are conveyed rather rapidly past the weighing devices, when the grading machine is operated at standard speed of approximately 160 pockets per minute, the chattering or vibrating of the scale beams will frequently cause premature discharge of the fruit or prevent the tripping of the pockets and the discharge of the fruit therefrom, so that the latter will be passed beyond its proper bin and will be discharged into the next bin for fruits of different size.

In a like manner the inertia and momentum of the scale weights during their return movement to balancing position may counteract the tripping action of a succeeding pocket passing over the scale mechanism and frequently prevent the tilting of these pockets and the discharge of the fruit therefrom at the proper place.

It is therefore the object of the present invention to provide a grading machine with an improved weighing mechanism which eliminates the undesirable lag in operation referred to herein and also obviates the improper functioning of the machine.

Other and further objects and advantages of the present invention will become apparent from the following description and drawing in which:

Fig. 1 is a perspective view of a portion of the grading machine of the present invention illustrating the improved weighing mechanism thereof.

Fig. 2 is a side elevation of a portion of the grading machine showing a part of the frame structure thereof in section and illustrating the position of the weighing mechanism with respect thereto.

Fig. 3 illustrates a front view of Fig. 2.

Fruit grading machines of the type referred to herein consist primarily of a trackway comprising the tracks 1 and 2 and a plurality of fruit holders or pockets 3 arranged therebetween. These holders are mounted within frames 4 pivotally connected to endless chains 5 and propelled thereby in the direction indicated by the arrow in Fig. 1, over a plurality of weighing devices along the trackway of the machine.

For the purpose of the present invention, only one of these fruit holders 3 and frames 4 has been completely illustrated, as the construction of this type of grading machine is clearly disclosed in the patent above referred to and well known in the art.

The frame 4 is provided with extensions 6 pivotally connected to the chains 5 above referred to which travel along the tracks 1 and 2, while a finger 7 secured to frame 4 extends laterally therefrom and rides upon the track 2 for maintaining the frame 4 and pocket 3 in substantially horizontal or fruit supporting position. The track 2 is provided with longitudinally extending cut-out portions 8, only one of which has been illustrated in Fig. 1, and positioned adjacent to each one of these portions 8 is a weighing mechanism generally indicated at 9 which is attached to the track 2 by means of a depending bracket 10. The bracket 10 is provided with elongated slots 12 through which screws 13 extend, which are threadedly secured to a knife-edged bar 14 for supporting the same in an adjustable manner on the bracket 10.

Fulcrumed upon the knife-edged bar 14 is a scale beam structure 15 which includes side bar members 16 and 17, a cross bar 18 and an inner bar 19. The side bar members 16 and 17 are provided with notches 20 within which the knife edge 21 of the bar 14 is received. The inner bar 19 extends upwardly into the cut-out portion 8 of the track 2 and is normally positioned in such a manner that the upper rounded edge 22 thereof is in alignment with the upper surface of the track 2 forming a depressible section thereof.

The scale beam structure 15 includes further a threaded rod 23 secured to the cross bar 18 intermediate the side bars 16 and 17 and extending parallel with respect thereto. Supported by the threaded rod 23 is a thimble 24 which is interiorly threaded and longitudinally adjustable on the rod. A thumb nut 25 on the rod 23 is further provided for locking the thimble 24 in desired position.

Attached to the thimble 24 by means of a retaining washer 27 is a pointer bar 28 relative to which the thimble is freely rotatable. The pointer bar 28 is provided with a slot 29 and receives therein an indicator bar 30 secured to the cross bar 18 and extending parallel with respect to the rod 23.

From the above it will therefore be seen that upon movement of the thimble 24 along the rod 23 the pointer bar 28 will be shifted therewith but held from rotation around the rod 23 by the engagement of the slotted end 31 thereof with the indicator bar 30.

The end 31 of the bar 28 serves as a pointer cooperating with graduations on the indicator bar 30 to facilitate adjustment of the thimble 24 to desired predetermined positions.

Attached to the lower portion of the pointer bar 28 and a screw 32, supported by a horizontal portion 33 of a bracket 34, is a coil spring 35. The bracket 34 is secured to the frame structure 36 of the grading machine adjacent the track 2 by means of screws 37. The screw 32 is adjustably mounted within a nut 38 rigidly connected to the horizontal portion of the bracket 34 and is provided with a lock nut 39 for locking the same in adjusted position. Guard members 40 attached to the bracket 34 may be preferably provided to protect the coil spring 35 against damage.

The construction of the spring 35 is of considerable importance and must be such as to reduce the lag in the operation of the scale beam to a minimum without causing chattering or vibrating of the scale beam and producing the disadvantages specifically referred to in the above. It has been found in practice that the spring 35 may be preferably made from #20 piano wire wound in 35¼ revolutions around an arbor of ⅜″ diameter. The spring so obtained is expanded until it has a length of 2⅝″ exclusive of the hooks at both ends thereof, with which it is connected to the pointer bar 28 and the screw 32 respectively, and all the convolutions of the spring are separated with respect to each other when the spring 35 is at rest; i. e., when under no stress.

The screw 32 is so positioned with respect to the threaded rod 23 and the thimble 24 that when the latter is in a position adjacent the cross bar 18, with the pointer 31 at the index number 4, the spring 35 will be in a vertical position and at its minimum tension. This position is utilized for grading the smallest size fruits as it has been found that the greatest accuracy in the operation of the weighing mechanism is obtained when the spring is at its minimum tension and this accuracy is necessary for separating the smallest fruits because the difference in their weight from one packing size to the next is less than that of larger size fruits.

For weighing of the larger size fruits the thimble is shifted along the rod 23 away from the cross bar 18 to desired positions and the lever arm of the scale beam upon which spring 35 acts is thereby increased, while at the same time a corresponding increase in the tension of the spring 35 is obtained.

It will thus be apparent that with this construction, the adjustment of the weighing mechanism is effected by simultaneously varying both the leverage of the spring on the scale beam and the tension of the spring, in such manner that as the leverage is increased the spring tension is likewise increased and vice versa. Thus the amount of variation in the leverage required to accommodate a given range of fruit sizes is held within minimum limits, and this in turn also minimizes both the variation in spring tension as well as variation in the amount of spring elongation when the scale beam is actuated. These are important factors in securing accurate and rapid sizing since it has been found that excessive variation in either the tension or elongation of the spring affects the accuracy of the weighing operation and hence it is desirable to keep both ranges within minimum limits.

It will also be apparent that by minimizing the variation in leverage required to accommodate a given range of fruit sizes, the rod 23 may be made comparatively short, thus reducing the mass of the scale beam which has to be moved when it is actuated, and further reducing its tendency to chatter.

With the above in mind it will therefore be seen that with the parts in a position as, for instance, shown in Fig. 1, the finger 7 will ride along the track 2 during the travel of the pocket 3 longitudinally of the machine and slide upon the upper edge 22 of the inner bar 19 when it passes the cut-out portion 8 of the track 2. Practically the entire weight of the pocket 3, frame 4, and the fruit positioned therein is now carried by the scale mechanism, and when this weight exceeds the turning moment of the scale beam the same will tilt around its fulcrum, causing lowering of the upper edge 22 of the bar 19 sufficiently below the track 2, so that the finger 7 supported thereby will drop below the upper surface of the track 2 and finally disengages during its travel from the inner bar 18 causing tripping of the pocket 3 effecting discharge of the fruit carried therein into a bin or like receptacle (not shown) positioned therebeneath.

The portion 41 of the track 2 adjacent the cut-out section 8 is formed into a knife edge so that the finger 7 will be properly guided above or below the track 2, depending upon the position of the inner bar 19 during the weighing operation.

Upon disengagement of the finger 7 from the inner bar 19 the scale beam returns under the action of spring 35 to its normal position as shown in Fig. 2.

Due to the fact that the convolutions of the spring 35 are separated with respect to each other, the vibrations of the scale beam are taken up and counteracted by the spring. It has been found in practice that the tension of the spring 35 causes a quick return of the scale beam after operation thereof to its original position, so that its side bar members 16 and 17 abut against the track 2 and are held in this position by the tension of the spring 35. The vibrational forces created incident to the completion of the weighing operation of the scale beam upon its contact with the track 2 are transferred to the spring 35, the convolutions of which will swing with high frequency vibrations longitudinally of the spring and will increase and decrease the tension of the spring in rapid succession and in opposite directions to the direction of the vibrational forces transferred thereto by the scale beam, which are thereby quickly and completely absorbed so as to prevent chattering of the beam.

While I have described a particular embodiment of the present invention, it will be obvious that various changes and modifications may be made in the details of the apparatus shown herein without departing from the spirit of the present invention and the scope of the appended claims.

Having now described my invention and in what manner the same may be used, what I claim as new and desire to protect by Letters Patent is:

1. A fruit grading machine comprising a trackway provided with a depressible section, a series of fruit holders supported by and movable along said trackway over said depressible section, a pivoted scale beam supporting said depressible section, and a coil spring having one end thereof secured to said scale beam for axial adjustment therealong, and having its other end so located with respect to the scale beam that adjustment of the spring to increase its leverage on the scale beam increases the tension of said spring.

2. A fruit grading machine comprising a trackway provided with a depressible section, a series of fruit holders supported by and movable along said trackway over said depressible section, a pivoted scale beam supporting said depressible section, a bracket adjacent said trackway, a thimble mounted on said scale beam for longitudinal adjustment therealong, and a coil spring having one end thereof secured to the thimble, and its other end secured to the bracket in such location that adjustment of the thimble to increase the leverage action of the spring on the scale beam also increases the spring tension and vice versa.

3. A fruit grading machine having a trackway provided with a depressible section, a series of fruit holders supported by and movable along said trackway over said depressible section, a pivoted scale beam supporting said depressible section, a bracket, a coil spring having one end thereof secured to said scale beam for axial adjustment therealong; and having its other end secured to said bracket in such location that adjustment of the spring to increase its leverage on said scale beam also increases the tension of said spring, said spring being of the type having its convolutions normally spaced apart under no stress conditions, and means maintaining said spring under such tension as to normally hold said depressible trackway section in elevated position and to counteract and prevent rebound of said section when the latter is suddenly released after being depressed.

PAUL VAN WYK.